(12) United States Patent
Ichimura

(10) Patent No.: US 8,301,007 B2
(45) Date of Patent: Oct. 30, 2012

(54) VIDEO AND AUDIO PROCESSING SYSTEM, VIDEO PROCESSING APPARATUS, AUDIO PROCESSING APPARATUS, OUTPUT APPARATUS, AND METHOD OF CONTROLLING THE SYSTEM

(75) Inventor: Gen Ichimura, Tokyo (JP)

(73) Assignee: Sony Corporation, Tokyo (JP)

( * ) Notice: Subject to any disclaimer, the term of this patent is extended or adjusted under 35 U.S.C. 154(b) by 1616 days.

(21) Appl. No.: 11/729,382

(22) Filed: Mar. 28, 2007

(65) Prior Publication Data

US 2007/0230913 A1    Oct. 4, 2007

(30) Foreign Application Priority Data

Mar. 31, 2006    (JP) ................................ 2006-098382

(51) Int. Cl.
*H04N 5/932* (2006.01)
*H04N 5/931* (2006.01)

(52) U.S. Cl. ...................................... 386/201; 386/207

(58) Field of Classification Search .................. 386/201, 386/207, 263, 264
See application file for complete search history.

(56) References Cited

U.S. PATENT DOCUMENTS

| | | | |
|---|---|---|---|
| 5,583,652 A * | 12/1996 | Ware | 386/206 |
| 2005/0238059 A1* | 10/2005 | Lundblad et al. | 370/503 |
| 2007/0019739 A1* | 1/2007 | Koyanagi et al. | 375/240.25 |
| 2008/0044160 A1* | 2/2008 | Maegaki | 386/96 |

FOREIGN PATENT DOCUMENTS

| | | | |
|---|---|---|---|
| EP | 1758387 A1 | | 2/2007 |
| JP | 2005-341256 | * | 8/2005 |
| JP | 2005341256 | | 12/2005 |
| JP | 2006-033436 A | | 2/2006 |
| WO | WO 2005/117427 A1 | | 12/2005 |
| WO | WO 2006/025441 A1 | | 3/2006 |

* cited by examiner

*Primary Examiner* — Robert Chevalier
(74) *Attorney, Agent, or Firm* — Wolf, Greenfield & Sacks, P.C.

(57) ABSTRACT

A video and audio processing system includes an output apparatus that outputs video data and audio data to be synchronized and reproduced; an audio processing apparatus that receives the video data and the audio data from the output apparatus, supplies at least the video data to a downstream apparatus, and processes the audio data to generate an audio signal to be supplied to a speaker; and a video processing apparatus that receives the video data output from the audio processing apparatus and generates a video signal used for displaying video. The video processing apparatus includes video signal processing means, control means, and determining means for determining a processing time. The video and audio processing system delays the audio signal to be supplied to the speaker so as to be synchronized with the displayed video on the basis of the determination result of the processing time.

18 Claims, 6 Drawing Sheets

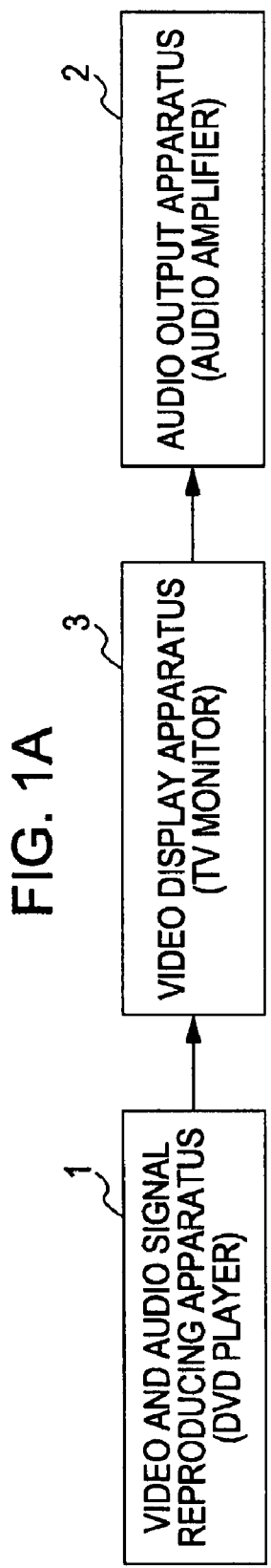
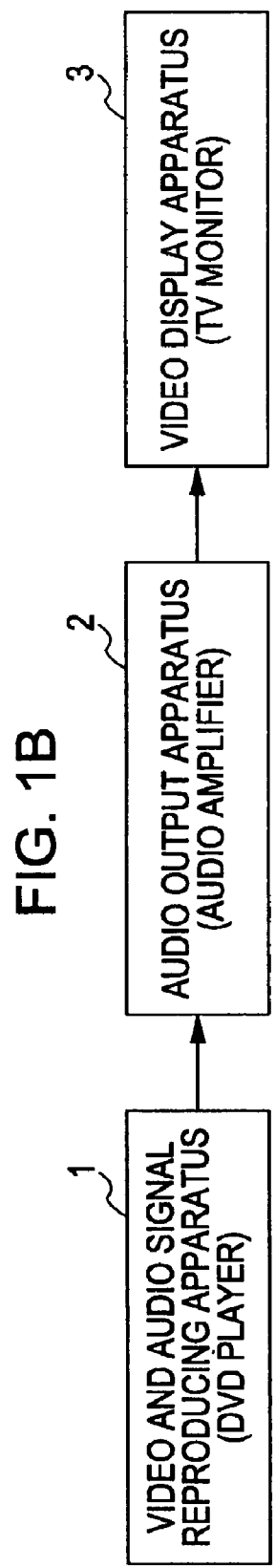
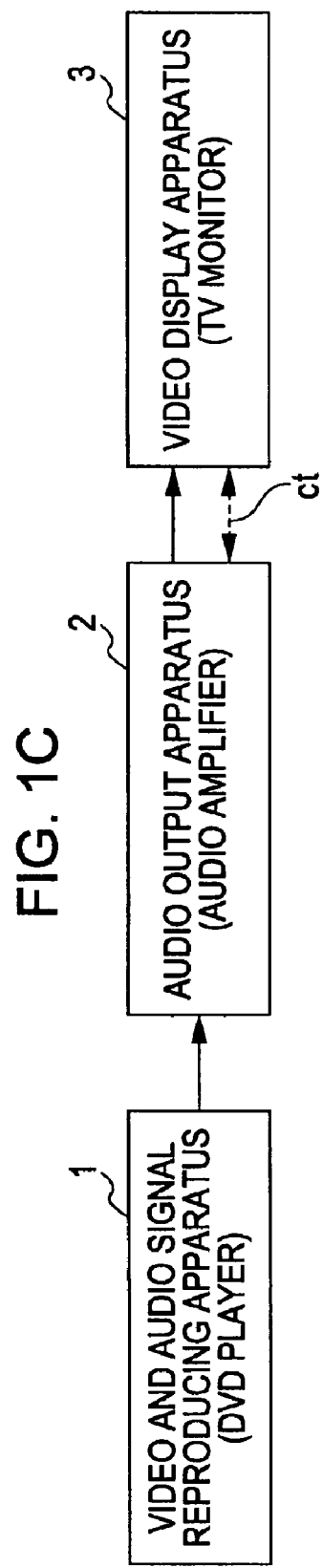

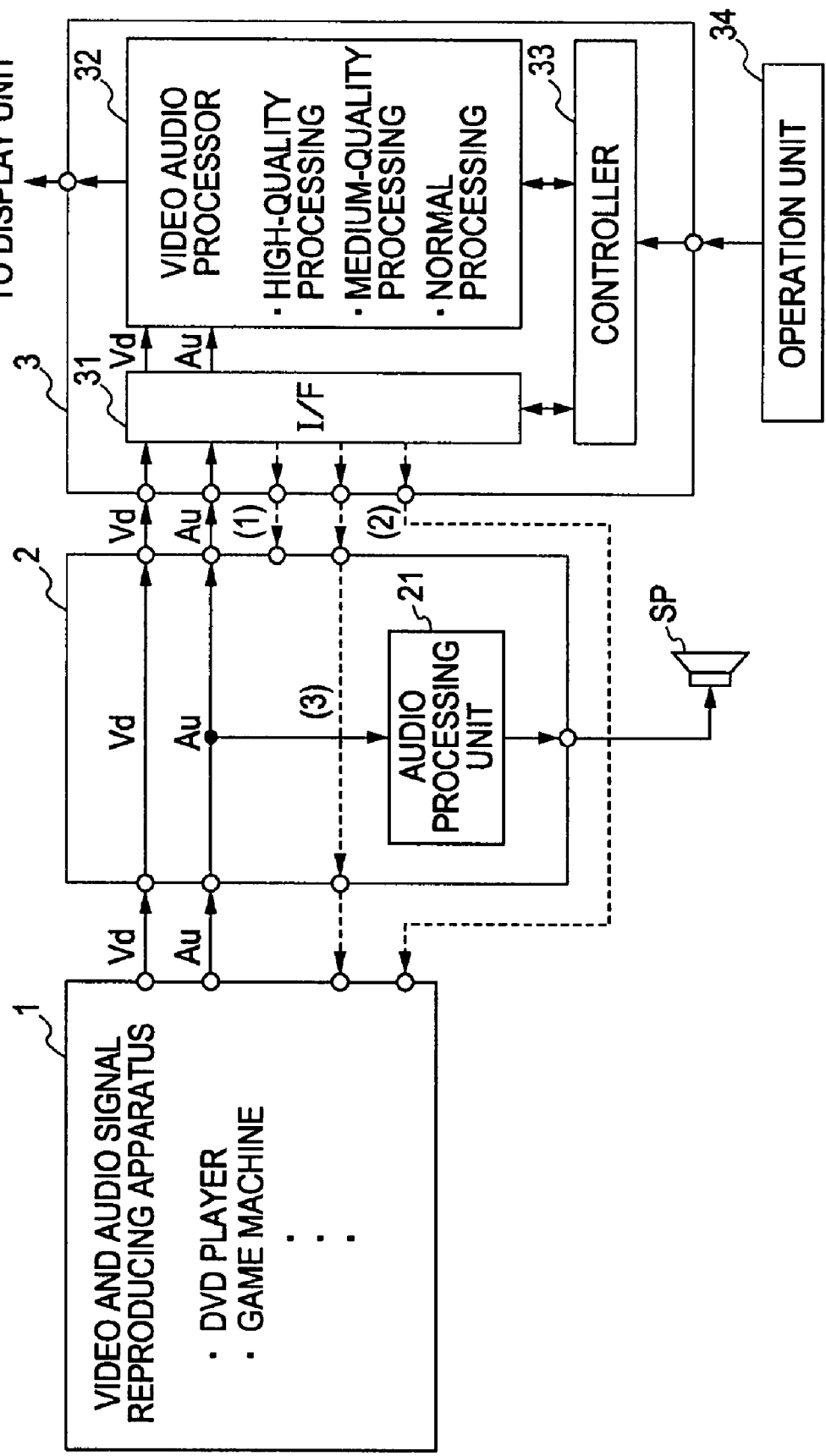

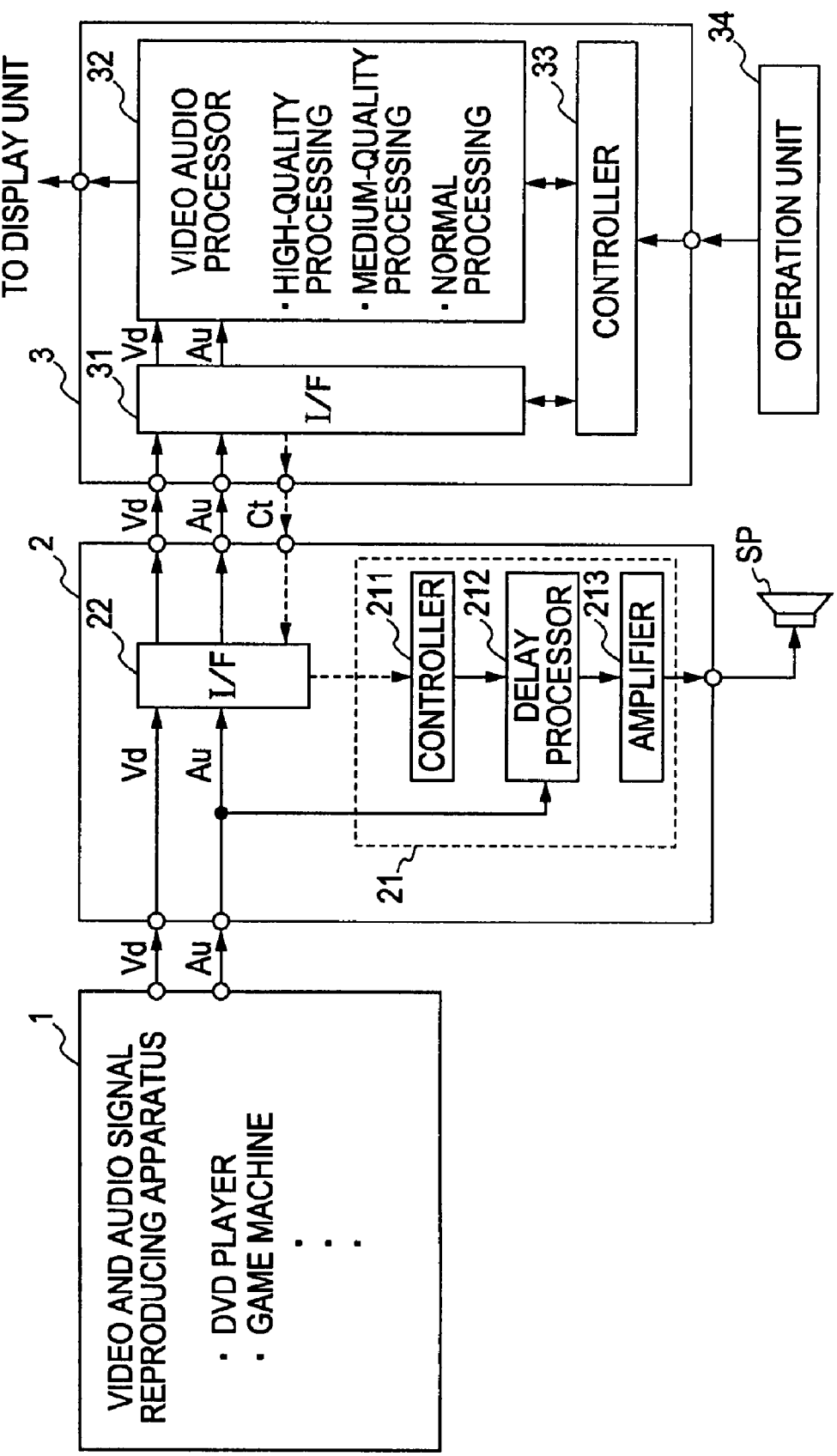

FIG. 4A

VIDEO AND AUDIO SIGNAL REPRODUCING APPARATUS (1) → AUDIO OUTPUT APPARATUS (2) → VIDEO DISPLAY APPARATUS (3)

| FIRST BYTE | ID |
|---|---|
| SECOND BYTE | DELAY INFORMATION |

FIG. 7

| FIRST BYTE | ID |
|---|---|
| SECOND BYTE | RESOLUTION |
| THIRD BYTE | DEFAULT DELAY INFORMATION |
| FOURTH BYTE | UPDATED DELAY INFORMATION |

US 8,301,007 B2

VIDEO AND AUDIO PROCESSING SYSTEM, VIDEO PROCESSING APPARATUS, AUDIO PROCESSING APPARATUS, OUTPUT APPARATUS, AND METHOD OF CONTROLLING THE SYSTEM

CROSS REFERENCES TO RELATED APPLICATIONS

The present invention contains subject matter related to Japanese Patent Application JP 2006-098382 filed in the Japanese Patent Office on Mar. 31, 2006, the entire contents of which are incorporated herein by reference.

BACKGROUND OF THE INVENTION

1. Field of the Invention

The present invention relates to a system, such as a home theater system, which processes video signals and audio signals to be synchronized and reproduced, an apparatus used in the system, and a method of synchronizing video and audio used in the system.

2. Description of the Related Art

Many pieces of digital content of, for example, movies recorded on digital versatile disks (DVDs) have been provided. Home theater systems are increasingly used so that users can enjoy high-quality video and audio of such digital content at home. Such a home theater system includes, for example, a video and audio signal reproducing apparatus 1, such as a DVD player, an audio output apparatus 2, such as an audio amplifier, and a video display apparatus 3, such as a TV monitor (TV set).

The video and audio signal reproducing apparatus 1 reads out video signals and audio signals of digital content of, for example, movies recorded on recording media, such as DVDs, and outputs the readout video and audio signals.

The audio output apparatus 2 generates audio signals to be supplied to a speaker from the audio signals supplied from the video and audio signal reproducing apparatus 1 and supplies the generated audio signals to the speaker. The audio signals may be a multi-channel signal, such as a 2-channel signal, a 4-channel signal, or a 5.1-channel signal.

The video display apparatus 3 generates video signals to be supplied to a display unit where video is displayed from the video signals supplied from the video and audio signal reproducing apparatus 1. Video signals by various scanning methods using various numbers of scanning lines are supplied to the video display apparatus 3. The scanning methods include 480p (progressive scanning (sequential scanning) using 480 effective scanning lines), 720p (progressive scanning using 720 effective scanning lines), and 1080i (interlaced scanning using 1,080 effective scanning lines). In other words, the video signals to be reproduced have various formats.

Since the video signals and the audio signals supplied from the video and audio signal reproducing apparatus 1 are processed in the different apparatuses, as described above, it takes different times to process the audio and video signals. Generally, the processing of the video signals takes more time than the processing of the audio signals because a larger amount of data is processed for the video signals. Accordingly, any delay (delay in lip synchronization) can be caused between the audio output from the speaker and the video displayed in the display unit and, thus, viewers (users) who view digital content that is played back can feel discomfort.

Consequently, if the video and audio signal reproducing apparatus 1, the video display apparatus 3, and the audio output apparatus 2 are sequentially connected to each other in this order as shown in FIG. 1A, detecting a time necessary to process the video signals in the video display apparatus 3 and delaying the output of the audio signals to be transmitted to the video display apparatus 3 in accordance with the detected time allow synchronization (lip synchronization) between the time when the video is displayed in the video display apparatus 3 and the time when the audio is output in the audio output apparatus 2.

However, in many home theater systems, the video and audio signal reproducing apparatus 1, the audio output apparatus 2, and the video display apparatus 3 are sequentially connected to each other in this order, as shown in FIG. 1B. In this case, since the audio output apparatus 2 does not know the time during which the video signals are processed in the video display apparatus 3, the video can be out of synchronization with the audio.

Accordingly, Japanese Unexamined Patent Application Publication No. 2006-33436 discloses a technology in which the audio output apparatus 2 is connected to the video display apparatus 3 also via a control line ct, as shown in FIG. 1C. In this technology, the audio output apparatus 2 acquires information concerning the processing times of the video signals having different formats from a memory in the video display apparatus 3 through the control line ct and delays the audio signals to be output in accordance with the formats of the video signals which the audio output apparatus 2 has received and which is supplied from the audio output apparatus 2 to the video display apparatus 3.

With the technology disclosed in Japanese Unexamined Patent Application Publication No. 2006-33436, the audio output apparatus 2 can control the delay of the audio signals in accordance with the formats of the video signals which are supplied from the audio output apparatus 2 to the video display apparatus 3 by acquiring the processing times of the video signals having different formats from the video display apparatus 3, for example, when the audio output apparatus 2 is turned on. In other words, it is possible to eliminate the delay (the delay in the lip synchronization) between the reproduced video and the reproduced audio, caused by the video display apparatus 3 that processes the video signals having different formats.

SUMMARY OF THE INVENTION

In the home theater systems each including the video and audio signal reproducing apparatus 1, the audio output apparatus 2, and the video display apparatus 3, shown in FIGS. 1A to 1C, the processing time of the video signals in the video display apparatus 3 is varied with the formats including 480p, 720p, and 1080i of the video signals.

However, there are cases in which the video display apparatus 3 has multiple signal processing modes, such as a film mode (high-quality mode), a camera mode (medium-quality mode), and a game mode (normal quality mode), for the video signals and the users can select an appropriate mode from the multiple signal processing modes to set the selected mode. The processing time of the video signals can be varied each time the signal processing mode is switched. As a result, it may not possible to completely eliminate the delay in the lip synchronization only with the technology disclosed in Japanese Unexamined Patent Application Publication No. 2006-33436.

In the film mode (high-quality mode), the video display apparatus 3 generates the video signals having the highest quality in the video display apparatus 3 (for example, the 1080i video signals) even if the 480p or 720p video signals are supplied. If the video signals with an image quality lower than that of the 1080i video signals are supplied, high-quality processing, such as interpolation of missing scanning lines, is performed.

In the camera mode (medium-quality mode), the video display apparatus 3 generates the video signals having the medium quality in the video display apparatus 3 (for example, the 720p video signals) even if the 480p video signals are supplied. If the video signals with an image quality lower than that of the 720p video signals are supplied, the high-quality processing, such as interpolation of missing scanning lines, is performed although the image quality is lower than that in the film mode (high-quality mode).

In the game mode, the video display apparatus 3 passes on the high-quality processing performed in the film mode or camera mode. The video display apparatus 3 directly processes the supplied video signals to generate the normal video signals and supplies the generated video signals to the display unit. For example, if the game machine is used as the video and audio signal reproducing apparatus 1, the video or audio should be reproduced by the game machine at appropriate timing in response to an operation by the user. However, the user may not enjoy the game if the switching of the reproduced video is delayed even when the reproduced audio is switched in response to the operation by the user. Accordingly, the game mode in which the extra high-quality processing is not performed is provided in the processing of the video of a game.

In the video display apparatus 3 having the multiple signal processing modes, for example, if the 480p video signals are supplied when the film mode (high-quality mode) is selected and set by the user, the interpolation of the missing scanning lines is performed for the 480p video signals to generate the video signals by the interlace scanning having the 1,080 effective scanning lines.

Accordingly, if the signal processing mode selected in the video display apparatus 3 is unknown when the format of the video signals to be processed is known, it is not possible to appropriately determine the processing time of the video signals in the video display apparatus 3. In addition, since the selection and input of the processing mode in the video display apparatus 3 by the user is performed at various timings, the processing time of the video signals in the video display apparatus 3 is varied at the various timings. In other words, the signal processing mode for the video signals, which is to be selected and input, is dynamically varied.

Accordingly, only the video display apparatus 3 can accurately determine the processing time of the video signals in real time. Consequently, as described above, it is not possible to support the processing time of the video signals which is dynamically varied with the switching of the processing modes in the video display apparatus 3 only by the technology disclosed in Japanese Unexamined Patent Application Publication No. 2006-33436. As a result, any delay in the lip synchronization may not be completely eliminated.

In order to resolve the above problems, according to an embodiment of the present invention, there is provided a video and audio processing system including an output apparatus that outputs video data and audio data to be synchronized and reproduced; an audio processing apparatus that receives the video data and the audio data from the output apparatus, supplies at least the video data to a downstream apparatus, and processes the audio data to generate an audio signal to be supplied to a speaker; and a video processing apparatus that receives the video data output from the audio processing apparatus and generates a video signal used for displaying video. The video processing apparatus includes video signal processing means for generating the video signal having a predetermined quality from the video data output from the audio processing apparatus, control means for controlling the processing in the video signal processing means on the basis of at least one of a format of the video data output from the audio processing apparatus and a signal processing mode that is set, and determining means for determining a processing time necessary to process the video data in the video signal processing means and display the video after the video data is received, if the content of the processing in the video signal processing means is changed by the control means. The video and audio processing system delays the audio signal to be supplied to the speaker so as to be synchronized with the displayed video on the basis of the determination result of the processing time by the determining means.

According to another embodiment of the present invention, there is provided a video processing apparatus included in a video and audio processing system further including an output apparatus that outputs video data and audio data to be synchronized and reproduced and an audio processing apparatus that receives the video data and the audio data from the output apparatus, supplies at least the video data to a downstream apparatus, and processes the audio data to generate an audio signal to be supplied to a speaker. The video processing apparatus receives the video data output from the audio processing apparatus and generates a video signal used for displaying video. The video processing apparatus includes video signal processing means for generating the video signal having a predetermined quality from the video data output from the audio processing apparatus; control means for controlling the processing in the video signal processing means on the basis of at least one of a format of the video data output from the audio processing apparatus and a signal processing mode that is set; determining means for determining a processing time necessary to process the video data in the video signal processing means and display the video after the video data is received, if the content of the processing in the video signal processing means is changed by the control means; and output means for supplying the determined processing time to another apparatus.

According to another embodiment of the present invention, there is provided an audio processing apparatus included in a video and audio processing system further including an output apparatus that outputs video data and audio data to be synchronized and reproduced and a video processing apparatus that receives the video data output from the audio processing apparatus and generates a video signal used for displaying video. The audio processing apparatus receives the video data and the audio data from the output apparatus, supplies at least the video data to a downstream apparatus, and processes the audio data to generate an audio signal to be supplied to a speaker. The audio processing apparatus includes receiving means for receiving information concerning a processing time necessary to perform video signal processing in which the video signal having a predetermined quality is generated from the video data from the video processing apparatus if the content of the video signal processing is changed; input means for receiving the audio data from the output apparatus; delay means for delaying a time necessary to supplying the audio data received by the input means to the speaker as the audio signal; and control means for controlling the delay time in the delay means on the basis of the information concerning the processing time received by the receiving means.

According to another embodiment of the present invention, there is provided an output apparatus outputting video data and audio data to be synchronized and reproduced. The output apparatus is included in a video and audio processing system further including an audio processing apparatus that receives the video data and the audio data from the output apparatus, supplies at least the video data to a downstream apparatus, and processes the audio data to generate an audio signal to be supplied to a speaker and a video processing apparatus that receives the video data output from the audio processing apparatus and generates a video signal used for displaying video. The output apparatus includes receiving means for receiving information concerning a processing time necessary to perform video signal processing in which the video signal having a predetermined quality is generated from the video data, the information concerning the processing time being output from the video processing apparatus if the content of the video signal processing is changed; output means for outputting the audio data; delay means for delaying the output of the audio data from the output means; and control means for controlling the delay time of the audio data in the delay means on the basis of the information concerning the processing time received by the receiving means.

According to another embodiment of the present invention, there is provided a control method for a video and audio processing system including an output apparatus that outputs video data and audio data to be synchronized and reproduced; an audio processing apparatus that receives the video data and the audio data from the output apparatus, supplies at least the video data to a downstream apparatus, and processes the audio data to generate an audio signal to be supplied to a speaker; and a video processing apparatus that receives the video data output from the audio processing apparatus and generates a video signal used for displaying video. The control method includes the steps of determining a processing time necessary for the video processing apparatus to generate the video signal having a predetermined quality from the video data on the basis of at least one of a format of the video data and a signal processing mode that is set if the content of the processing is changed and delaying the audio signal to be supplied to the speaker on the basis of the determined processing time.

According to another embodiment of the present invention, there is provided a video and audio processing system including an output apparatus that outputs video data and audio data to be synchronized and reproduced; an audio processing apparatus that receives the video data and the audio data from the output apparatus, supplies at least the video data to a downstream apparatus, and processes the audio data to generate an audio signal to be supplied to a speaker; and a video processing apparatus that receives the video data output from the audio processing apparatus and generates a video signal used for displaying video. The video processing apparatus includes video signal processing means for generating the video signal having a predetermined quality from the video data output from the audio processing apparatus; control means for controlling the processing in the video signal processing means on the basis of at least one of a format of the video data output from the audio processing apparatus and a signal processing mode that is set; determining means for determining a processing time necessary to process the video data in the video signal processing means and display the video after the video data is received, if the content of the processing in the video signal processing means is changed by the control means; and indicating means for indicating the processing time determined by the determining means to the audio processing apparatus. The audio processing apparatus includes acquiring means for acquiring information concerning the processing time indicated by the video processing apparatus; difference calculating means for calculating a difference between the processing time indicated by the video processing apparatus and a processing time of the audio signal in the audio processing apparatus; and difference indicating means for indicating information concerning the difference in the processing time calculated by the difference calculating means to the output apparatus. The output apparatus includes delay means for delaying the audio signal to be output; difference acquiring means for acquiring information concerning the difference in the processing time, indicated by the audio processing apparatus; and delay control means for controlling the delay time of the audio signal in the delay means on the basis of the information concerning the difference in the processing time acquired by the difference acquiring means.

BRIEF DESCRIPTION OF THE DRAWINGS

FIG. 1A illustrates an example of a video and audio processing system in related art;

FIG. 1B illustrates another example of the video and audio processing system in the related art;

FIG. 1C illustrates another example of the video and audio processing system in the related art;

FIG. 2 is a block diagram showing an example of the structure of a video and audio processing system according to an embodiment of the present invention;

FIG. 3 is a block diagram showing an example of the structure of a video and audio processing system according to another embodiment of the present invention, in which a video display apparatus indicates delay control information only to an audio output apparatus;

FIGS. 4A and 4B are block diagrams showing an example of the structure of a video and audio processing system according to another embodiment of the present invention, in which the video display apparatus indicates the delay control information only to a video and audio signal reproducing apparatus;

FIG. 6 illustrates an example in which the delay control information has two bytes; and FIG. 7 illustrates an example in which the delay control information has four bytes.

DESCRIPTION OF THE PREFERRED EMBODIMENTS

Figure 5:
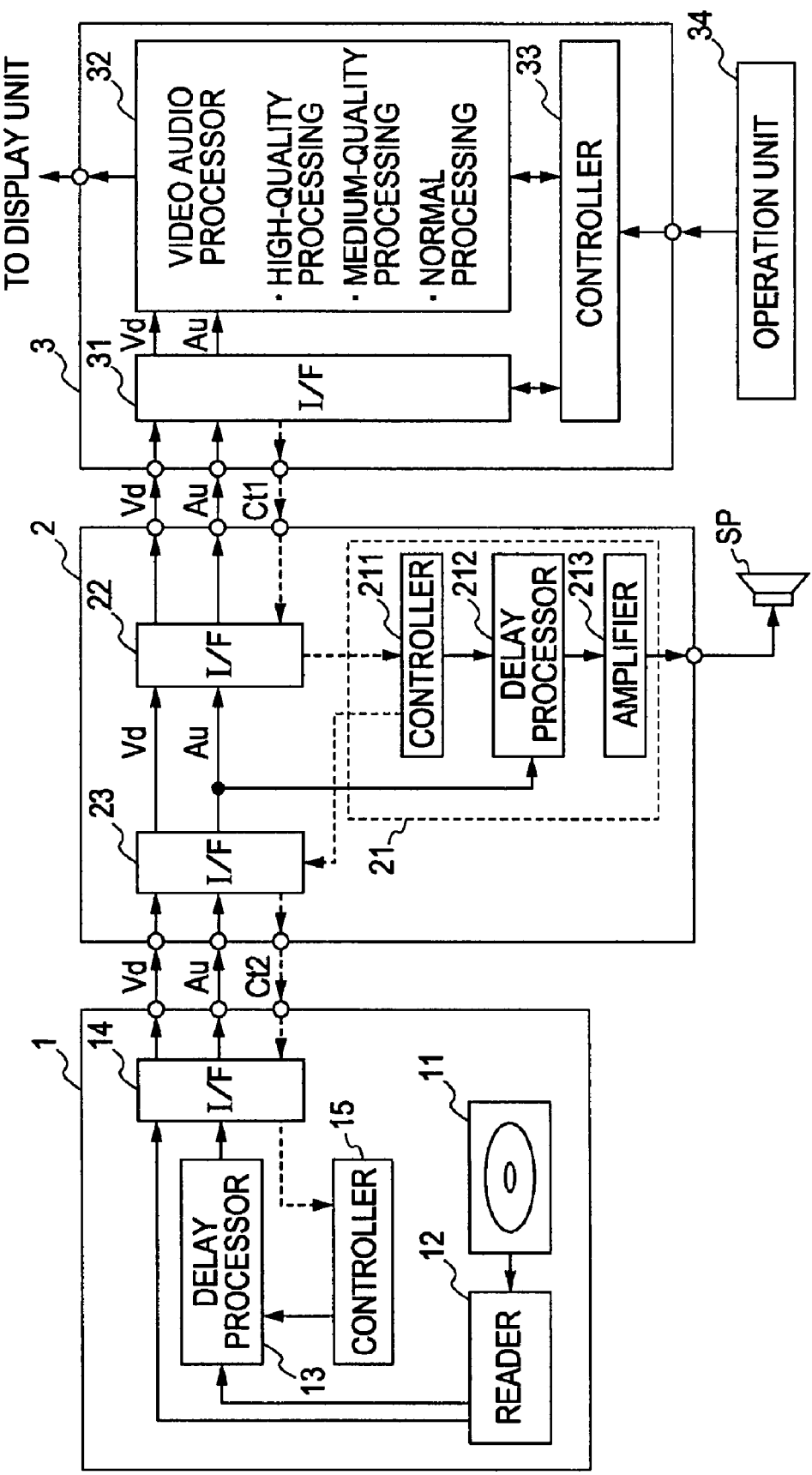
FIG. 5 is a block diagram showing an example of the structure of a video and audio processing system according to another embodiment of the present invention, in which the video display apparatus indicates the delay control information to both the audio output apparatus and the video and audio signal reproducing apparatus.

Systems, apparatuses, and methods according to embodiments of the present invention will now be described in detail with reference to the attached drawings.

Summary of Video and Audio Processing System

FIG. 2 is a block diagram showing an example of the structure of a video and audio processing system according to an embodiment of the present invention. A system, apparatuses, and a method according to embodiments of the present invention are applied to the video and audio processing system.

As shown in FIG. 2, the video and audio processing system according to the embodiment of the present invention basically includes a video and audio signal reproducing apparatus 1, an audio output apparatus 2, and a video display apparatus 3. The video and audio signal reproducing apparatus 1 is connected to the audio output apparatus 2 via a video signal line through which a video signal Vd is transmitted and an audio signal line through which an audio signal Au is transmitted. The audio output apparatus 2 is connected to the video display apparatus 3 via the video signal line through which the video signal Vd is transmitted and the audio signal line through which the audio signal Au is transmitted. In addition, the video display apparatus 3 is connected to the audio output apparatus 2 via a control signal line through which a control signal Ct is transmitted. The video display apparatus 3 is connected to the video and audio signal reproducing apparatus 1 via the control signal line through which the control signal Ct is transmitted. The control signal lines are indicated by dotted lines in FIG. 2.

The video and audio signal reproducing apparatus 1 corresponds to an output apparatus outputting the video signal Vd and the audio signal Au to be synchronized and reproduced. The video and audio signal reproducing apparatus 1 is exemplified not only by various playback apparatuses and recording and reproducing apparatuses, such as a DVD player, a game machine, and a hard disk recorder, but also by various apparatuses, such as a television tuner, a satellite broadcasting receiver or a cable broadcasting receiver called an integrated receiver decoder (IRD) or set-top box, and a personal computer having a communication function, which output the video signal Vd and the audio signal Au to be synchronized and reproduced.

The audio output apparatus 2 corresponds to an audio processing apparatus that receives the video signal Vd and the audio signal Au from the video and audio signal reproducing apparatus (output apparatus) 1, supplies at least the video signal Vd to a downstream apparatus, and supplies the audio signal Au to a speaker SP after the audio signal Au is processed in an audio processing unit 21. The audio output apparatus 2 supplies the video signal Vd and the audio signal Au to the downstream video display apparatus 3 and converts the audio signal Au into an audio signal to be supplied to the speaker SP to supply the converted audio signal to the speaker SP.

The audio output apparatus 2 is exemplified by, for example, an audio visual amplifier or an audio amplifier. For example, the 2-channel, 4-channel, or 5.1-channel audio signal can be supplied as the audio signal Au. The audio output apparatus 2 supports a multi-channel audio signal, such as the 5.1-channel audio signal. The audio processing unit 21 in the audio output apparatus 2 separates the audio signal Au into audio signal components to be supplied to speakers of different channels to generate analog audio signals, performs amplification to the audio signals if needed, and supplies the audio signals to the speakers of the corresponding channels.

The video display apparatus 3 corresponds to a video processing apparatus that receives at least the video signal Vd from the audio output apparatus (audio processing apparatus) 2 and generates a video signal to be supplied to a display unit where video is displayed. The video display apparatus 3 includes an interface (hereinafter abbreviated to I/F) 31, a video audio processor 32, a controller 33, and an operation unit 34, as in the example shown in FIG. 2.

The I/F 31 acquires the video signal Vd and the audio signal Au from the audio output apparatus 2 and supplies the video signal Vd and the audio signal Au to the video audio processor 32. The I/F 31 detects the format (the number of scanning lines and the scanning method) of the acquired video signal Vd to indicate the detected format to the controller 33 and detects, for example, the number of channels of the acquired audio signal Au to indicate the detected number of channels to the controller 33. In addition, the I/F 31 transmits control information through the control signal line indicated by the dotted line in FIG. 2.

The video audio processor 32 receives the video signal Vd and the audio signal Au, generates a video signal to be supplied to the display unit in the video display apparatus 3 (the video signal used for displaying the video) and an audio signal to be supplied to a speaker in the video display apparatus 3, and supplies the generated video signal and audio signal to the display unit and the speaker, respectively. The video audio processor 32 may generate video signals having different image qualities, for example, for high-quality processing, medium-quality processing, and normal processing, under the control of the controller 33, as described below.

The controller 33 is a microcomputer in which a central processing unit (CPU), a read only memory (ROM), a random access memory (RAM), and a non-volatile memory, such as a flash memory or an electronically erasable and programmable read only memory (EEPROM), are connected to each other via a CPU bus, which are not shown in FIG. 2. The controller 33 controls the components in the video display apparatus 3.

The operation unit 34 has various operational keys including a power key, a numeric keypad, and various function keys. The operation unit 34 receives an operation instruction from a user, converts the instruction into an electrical signal, and supplies the electrical signal to the controller 33. The controller 33 controls the components in the video display apparatus 3 in response to the instruction that is input by the user with the operation unit 34 to perform processing intended by the user.

The video display apparatus 3 according to the embodiment of the present invention is provided with the display unit, such as a liquid crystal display (LCD), an organic electro luminescence (organic EL) display, or a cathode ray tube (CRT) display, and the speaker, which are not shown in FIG. 2.

The video display apparatus 3 according to the embodiment of the present invention has a basic function of receiving the video signal Vd and the audio signal Au from the audio output apparatus 2 through the I/F 31, generating a video signal to be supplied to the display unit in the video display apparatus 3 for the video signal Vd in the video audio processor 32 to supply the generated video signal to the display unit, and generating an audio signal to be supplied to the speaker in the video display apparatus 3 for the audio signal Au in the video audio processor 32 to supply the generated audio signal to the speaker.

The video audio processor 32 in the video display apparatus 3 has a function of delaying the output of the audio signal in accordance with the processing time of the video signal, so that no delay in the lip synchronization is caused between the video and the audio output from the audio output apparatus 2. In the embodiment of the present invention, the audio is mainly output from the speaker SP connected to the audio output apparatus 2 and the user listens to the audio output from the speaker SP. Accordingly, the audio system, such as the speaker, in the video display apparatus 3 is not shown in the figures and a detailed description of the audio system is omitted herein.

The video display apparatus 3 according to the embodiment of the present invention has three signal processing modes including a film mode (high-quality mode), a camera mode (medium-quality mode), and a game mode (normal quality mode) for the video signal. A desired signal processing mode is selected from the three signal processing modes with the operation unit 34 and the selected signal processing mode is set in, for example, the non-volatile memory in the controller 33.

In the film mode (high-quality mode), the video display apparatus 3 generates the video signal having the highest quality to display the video corresponding to the video signal. If the scanning lines or horizontal pixels are insufficient, high-quality processing, such as interpolation of missing scanning lines or horizontal pixels, is performed. In the camera mode (medium-quality mode), the video display apparatus 3 generates the video signal having the medium quality to display the video corresponding to the video signal. If the scanning lines or horizontal pixels are insufficient, the high-quality processing, such as the interpolation of missing scanning lines or horizontal pixels, is performed although the image quality is lower than that in the film mode (high-quality mode). In the game mode, the video display apparatus 3 passes on the high-quality processing performed in the film mode or camera mode and generates the normal video signal to supply the generated video signal to the display unit.

The controller 33 in the video display apparatus 3 according to the embodiment of the present invention determines the content of the video signal processing in the video audio processor 32 on the basis of information indicating the format (the number of scanning lines and the scanning method) of video signal supplied to the controller 33 through the I/F 31 or the signal processing mode selected and set by the user with the operation unit 34. The controller 33 controls the video signal processing in the video audio processor 32 in accordance with the determined content.

If the format of the supplied video signal is changed or the signal processing mode set in the non-volatile memory is switched while the controller 33 is turned on, the controller 33 controls the video audio processor 32 so as to change the content of the processing in accordance with the change in the format or the signal processing mode.

Specifically, if the controller 33 detects that the format of the video signal is changed or the setting of the signal processing mode is switched, the controller 33 changes the content of the processing in the video audio processor 32 in accordance with the format of the video signal or the signal processing mode in order to accommodate the change in the format of the video signal or the switching of the setting of the signal processing mode at various timings. The controller 33 can dynamically control the change (switching) of the content of the processing in the video audio processor 32.

In addition, the controller 33 determines the processing time necessary to process the video signal on the basis of the determined content of the processing in the video audio processor 32 and indicates information concerning the determined processing time to at least one of the audio output apparatus 2 and the video and audio signal reproducing apparatus 1 upstream of the video display apparatus 3, through the I/F 31 and the control signal lines indicated by the dotted lines in FIG. 2, as delay control information for the audio signal.

Also in the indication of the delay control information, the controller 33 acquires the correct delay control information (latest delay control information) at the timing of the change of the content of the processing in the video audio processor 32 to indicate the acquired delay control information to at least one of the audio output apparatus 2 and the video and audio signal reproducing apparatus 1 upstream of the video display apparatus 3, through the I/F 31 and the control signal lines indicated by the dotted lines in FIG. 2.

The output of the audio signal is delayed in at least one of the audio output apparatus 2 and the video and audio signal reproducing apparatus 1 to which the delay control information is indicated to synchronize the reproduced audio output from the speaker SP connected to the audio output apparatus 2 with the reproduced video displayed on the screen of the display unit in the video display apparatus 3.

Three embodiments of the indication of the delay control information and the delay processing will now be described. In the first embodiment, as shown by a dotted line (1) in FIG. 2, the video display apparatus 3 indicates the delay control information only to the audio output apparatus 2 and the delay processing of the audio signal is performed only in the audio output apparatus 2. In the second embodiment, as shown by a dotted line (2), the video display apparatus 3 indicates the delay control information only to the video and audio signal reproducing apparatus 1 and the delay processing of the audio signal is performed only in the video and audio signal reproducing apparatus 1. In the third embodiment, as shown by a dotted line (3), the video display apparatus 3 indicates the delay control information to both the audio output apparatus 2 and the video and audio signal reproducing apparatus 1, and both the audio output apparatus 2 and the video and audio signal reproducing apparatus 1 delay the audio signal in a distributed manner. Video and audio processing systems to which the first (1) to third (3) embodiments are applied will now be described in detail.

First Embodiment

FIG. 3 is a block diagram showing an example of the structure of a video and audio processing system to which the first embodiment is applied (corresponding to the dotted line (1) in FIG. 2), in which the video display apparatus 3 indicates the delay control information only to the audio output apparatus 2 and the delay processing of the audio signal is performed only in the audio output apparatus 2.

The video and audio processing system shown in FIG. 3 includes the video and audio signal reproducing apparatus 1, the audio output apparatus 2, and the video display apparatus 3, as in the example shown in FIG. 2. As described above with reference to FIG. 2, the video signal Vd and the audio signal Au which are output from the video and audio signal reproducing apparatus 1 and which are to be synchronized and reproduced are supplied to the audio output apparatus 2 and are also supplied to the video display apparatus 3 through the audio output apparatus 2.

In the example shown in FIG. 3, the audio output apparatus 2 is connected to the video display apparatus 3 via, for example, a digital interface according to a high-definition multimedia interface (HDMI) specification. The HDMI specification is a digital interface specification for next generation television. The HDMI specification results from adding functions for home electric appliances (so-called audio/visual (AV) devices) to a digital visual interface (DVI) standard, which has been adopted in many cases including displays for personal computers, while the backward compatibility is kept. According to the HDMI specification, the video line (video signal line), the audio line (audio signal line), and the control line (control signal line) can be connected to each other by using one connector.

In other words, according to the HDMI specification, the high-definition video, the multi-channel audio, and the control signal can be transferred with one connector without separately connecting the respective signal lines. Accordingly, the use of the HDMI specification has the advantage of, for example, easy disconnection of the cable. The HDMI specification has a highest data transfer speed of 5 Gbit/sec. The HDMI specification supports a high-bandwidth digital content protection (HDCP) system, which is an encryption method for digital image signals.

In the video and audio processing system in FIG. 3, both the I/F 31 in the video display apparatus 3 and an interface (I/F) 22 in the audio output apparatus 2 are compliant with the HDMI specification. In other words, the video and audio processing system in FIG. 3 has a function of encrypting a transmission signal and decrypting a reception signal.

Configuration and Operation of Video Display Apparatus 3 in FIG. 3

The video display apparatus 3 in the video and audio processing system in FIG. 3 has the three signal processing modes including the film mode (high-quality mode), the camera mode (medium-quality mode), and the game mode (normal quality mode) for the video signal, as described above with reference to FIG. 2. A desired signal processing mode is selected from the three signal processing modes with the operation unit 34 and the selected signal processing mode is set in, for example, the non-volatile memory in the controller 33.

As described above, information indicating the format (the number of scanning lines and the scanning method) of the video signal supplied to the video display apparatus 3 through the I/F 31, for example, information indicating the format, such as 480p, 720p, or 1080i, of the video signal is indicated to the controller 33 in the video display apparatus 3. Accordingly, the controller 33 controls the video audio processor 32 on the basis of the format of the video signal supplied to the video display apparatus 3 and the signal processing mode set in the non-volatile memory in the controller 33.

Specifically, if the film mode (high-quality mode) is selected and set, the controller 33 controls the video audio processor 32 so as to generate the video signal having the highest quality in the video display apparatus 3 to perform the high-quality processing regardless of the format of the supplied video signal.

If the 480p or 720p video signal is supplied and the film mode (high-quality mode) is selected and set, the controller 33 controls the video audio processor 32 so as to perform the high-quality processing in which the missing scanning lines or horizontal pixels are interpolated, to generate, for example, the 1080i video signal for display, and to supply the generated video signal to the display unit where the video is displayed.

If the 1080i video signal is supplied and the film mode (high-quality mode) is selected and set, the controller 33 controls the video audio processor 32 so as not to degrade the 1080i video signal, to generate the 1080i video signal for display, and to supply the generated video signal to the display unit where the video is displayed.

If the camera mode (medium-quality mode) is selected and set and a lower-quality video signal is supplied, the controller 33 controls the video audio processor 32 so as to generate a medium-quality video signal to perform the medium-quality processing. If necessary, the high-quality processing, such as the interpolation of missing scanning lines or horizontal pixels, is performed although the image quality is not higher than that in the film mode (high-quality mode).

If the 480p video signal is supplied and the camera mode (medium-quality mode) is selected and set, the controller 33 controls the video audio processor 32 so as to perform the high-quality processing in which the missing scanning lines or horizontal pixels are interpolated, to generate, for example, the 720p video signal for display, and to supply the generated video signal to the display unit where the video is displayed.

If the 720p or 1080i video signal is supplied and the camera mode (medium-quality mode) is selected and set, the controller 33 controls the video audio processor 32 so as not to degrade the 720p or 1080i video signal, to generate the 720p or 1080i video signal for display, and to supply the generated video signal to the display unit where the video is displayed.

As described above, with the film mode (high-quality mode) or the camera mode (medium-quality mode) being selected and set, the controller 33 controls the video audio processor 32 so as not to perform down-conversion to degrade the image quality if the medium-quality or high-quality video signal is supplied, and controls the video audio processor 32 so as to perform up-conversion into the high-quality or medium-quality video signal to display the high-quality or medium-quality video if the lower-quality video signal is supplied.

If the game mode is selected and set, the controller 33 controls the video audio processor 32 so as to pass on the high-quality processing in which the scanning lines or the horizontal pixels are interpolated, performed in the film mode and the camera mode, and to perform the normal processing to generate the normal video signal. Accordingly, if the 480p video signal is supplied and the game mode is selected and set, the controller 33 controls the video audio processor 32 so as to generate the 480p video signal for display and to display the video corresponding to the generated video signal.

If the 720p or 1080i video signal is supplied and the game mode is selected and set, the controller 33 may control the video audio processor 32 so as to generate the 720p or 1080i video signal for display and to display the video corresponding to the generated video signal. However, it can take time to generate the 720p or 1080i video signal for display.

Accordingly, in the video display apparatus 3 according to the embodiment of the present invention, in order to decrease the processing time for displaying the video as much as possible, the controller 33 controls the video audio processor 32 so as to decimate the scanning lines or the horizontal pixels, to generate the 480p video signal for display, and to display the video corresponding to the generated video signal if the 720p or 1080i video signal is supplied and the game mode is selected and set.

As described above, only in the game mode, the high-quality processing is not performed, and the time necessary to process the video signal and display the video corresponding to the video signal after the video signal is received can be reduced.

Furthermore, the controller 33 accurately determines the processing time of the video signal in the video audio processor 32 in accordance with how the video audio processor 32 is controlled to determine the processing time necessary to process the video signal and display the video corresponding to the video signal on the screen of the display unit after the video signal is received, and indicates information concerning the processing time to the audio output apparatus 2 through the I/F 31 as delay control information Ct for the audio signal. The delay control information Ct corresponding to the determined processing time may be the processing time itself or may be information with which the amount of delay of the audio signal can be determined in the apparatus to which the delay control information Ct is supplied. For example, the delay control information Ct may be level information that is divided into levels in advance.

According to the embodiment of the present invention, as described above, if the film mode (high-quality mode) is selected and set, it takes different processing times of the video signal depending on which video signal, among the 480p video signal, the 720p video signal, and the 1080i video signal, is supplied. Similarly, if the camera mode (medium-quality mode) is selected and set, it takes different processing times of the video signal depending on which video signal, among the 480p video signal, the 720p video signal, and the 1080i video signal, is supplied.

If the game mode is selected and set, it takes different processing times of the video signal depending on which video signal, among the 480p video signal, the 720p video signal, and the 1080i video signal, is supplied. Accordingly, the controller 33 in the video display apparatus 3 according to the embodiment of the present invention can accurately determine the time necessary to process the video signal in the video audio processor 32 for every signal processing mode and for every format of the supplied video signal to determine the time necessary to process the video signal and display the video corresponding to the video signal on the screen of the display unit after the video signal is received.

As described above, if the format of the supplied video signal is changed or the signal processing mode selected and set by the user is switched, the video display apparatus 3 in the video and audio processing system according to the embodiment of the present invention can accurately control the content of the processing for the video signal in the video audio processor 32 in accordance with the latest format of the video signal and the signal processing mode that is selected and set most recently, can determine the processing time necessary to process the video signal and display the video corresponding to the video signal after the video signal is received, and can indicate information concerning the processing time to the audio output apparatus 2 through the I/F 31 and the control signal line indicated by dotted line as the delay control information Ct for the audio signal.

Configuration and Operation of Audio Output Apparatus 2 in FIG. 3

The audio output apparatus 2 in the video and audio processing system shown in FIG. 3 includes the audio processing unit 21 and the I/F 22 according to the HDMI specification, as described above. The I/F 22 supplies the video signal Vd and the audio signal Au, supplied from the video and audio signal reproducing apparatus 1, and the control information to the video display apparatus 3 through the video signal line, the audio signal line, and the control signal line indicated by the dotted line in FIG. 3. In addition, the I/F 22 acquires the indication of the delay control information Ct from the video display apparatus 3 through the control signal line indicated by the dotted line.

When the I/F 22 in the audio output apparatus 2 acquires the delay control information Ct from the video display apparatus 3, the I/F 22 converts the delay control information Ct into information processable in the audio output apparatus 2 and supplies the information to a controller 211 in the audio processing unit 21. As shown in FIG. 3, the audio processing unit 21 in the example in FIG. 3 includes the controller 211, a delay processor 212, and an amplifier 213.

The controller 211 is a microcomputer including a CPU, a ROM, a RAM, and so on (not shown). The controller 211 controls the components in the audio processing unit 21. For example, the controller 211 controls the delay processing of the audio signal in the delay processor 212 on the basis of the delay control information Ct supplied from the video display apparatus 3 through the I/F 22.

The delay processor 212 is controlled by the controller 211, as described above. The delay processor 212 receives the audio signal Au from the video and audio signal reproducing apparatus 1, performs the delay processing to the audio signal Au in accordance with the delay control information Ct from the video display apparatus 3 to delay the audio signal Au in accordance with the processing time of the video signal in the video display apparatus 3, and supplies the delayed audio signal to the amplifier 213. The amplifier 213 is also controlled by the controller 211. The amplifier 213 amplifies the supplied audio signal and supplies the amplified audio signal to the speaker SP.

Since the delay processor 212 in the audio output apparatus 2 delays the audio signal to be supplied to the speaker SP in accordance with the delay control information Ct for the audio signal, supplied from the video display apparatus 3, it is possible to synchronize the video displayed on the screen of the display unit of the video display apparatus 3 with the audio output from the speaker SP of the audio output apparatus 2, thereby preventing any delay in the lip synchronization.

Only the video display apparatus 3 can rapidly and accurately determine whether the processing time of the video signal in the video display apparatus 3 is varied. Accordingly, even if the format of the supplied video signal is changed or the setting of the signal processing mode is switched, it is possible for the video display apparatus 3 to appropriately control the video audio processor 32, to accurately determine the time necessary to process the video signal, and to appropriately delay the audio signal to be output from the audio output apparatus 2 in accordance with the time necessary to process the video signal.

In video and audio processing systems in related art, only the video display apparatus 3 can know the switching of the signal processing mode if the signal processing mode is switched from the film mode or the camera mode to the game mode with the operation unit 34. Accordingly, the delay processing of the audio signal corresponding to the film mode or the camera mode can be continued in the audio output apparatus 2 without the latest delay control information Ct for the audio signal that is supplied from the video display apparatus 3 to the audio output apparatus 2.

In this case, if the game mode is selected, the normal processing in which the lower-quality video signal is output is performed in the video display apparatus 3 and it takes less time to process the video signal. In contrast, the delay processing is performed to the audio signal in the film mode or the camera mode. As a result, the reproduction of the audio can be delayed from the reproduced video varied in accordance with an operation of the user in the game. The user cannot enjoy the game if the reproduced audio is delayed from the reproduced video.

However, in the example of the video and audio processing system shown in FIG. 3, if the format of the supplied video signal is changed or the selected signal processing mode is switched in the video display apparatus 3, it is possible to control the delay processing of the audio signal in the audio output apparatus 2 at appropriate timing because the delay control information Ct for the audio signal, determined on the basis of the processing time of the video signal, is supplied from the video display apparatus 3 to the audio output apparatus 2.

The controller 211 in the audio output apparatus 2 appropriately controls the amount of delay of the audio signal in the delay processor 212 in consideration of the processing time of the audio signal Au in the audio output apparatus 2.

Although the video signal Vd is supplied to the speaker SP for simplicity, the present invention is not limited to this case. Practically, the multi-channel audio signal, such as the 2-channel, the 4-channel, or the 5.1-channel audio signal, is processed. In such a case, for example, the audio signal supplied from the video and audio signal reproducing apparatus 1 is separated into the audio signal components for channels in the delay processor 212. The audio signal components are delayed in the above manner, are subjected to the amplification, and are supplied to the corresponding speakers.

Second Embodiment

Figures 4A, 4B:
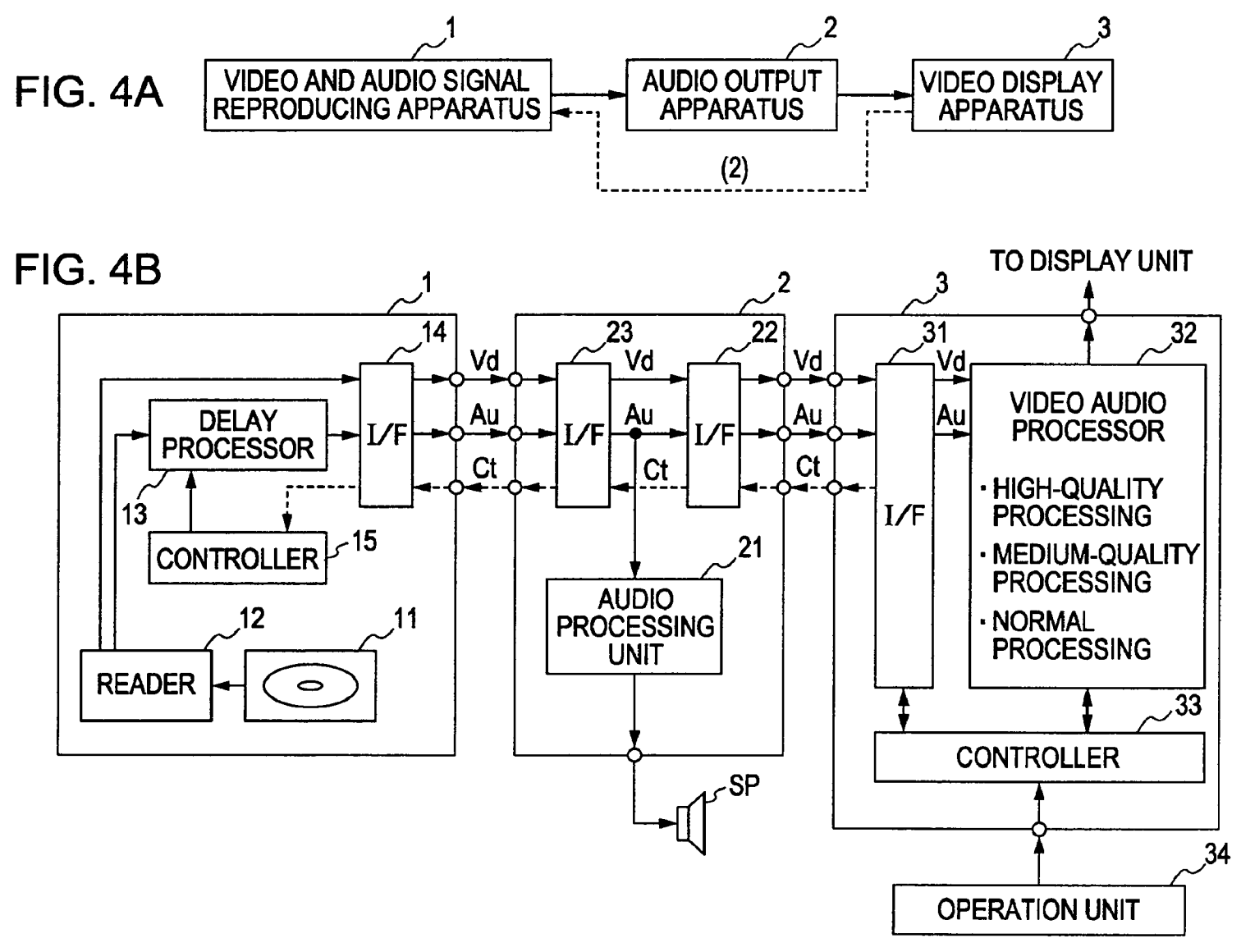

FIGS. 4A and 4B are block diagrams showing an example of the structure of a video and audio processing system to which the second embodiment is applied (corresponding to the dotted line (2) in FIG. 2), in which the video display apparatus 3 indicates the delay control information only to the video and audio signal reproducing apparatus 1 and the delay processing of the audio signal is performed only in the audio signal reproducing apparatus 1.

The video and audio processing system shown in FIGS. 4A and 4B includes the video and audio signal reproducing apparatus 1, the audio output apparatus 2, and the video display apparatus 3, as described above with reference to FIG. 2 and as in the video and audio processing system shown in FIG. 3. As described above with reference to FIG. 2, the video signal Vd and the audio signal Au that are output from the video and audio signal reproducing apparatus 1 and that are to be synchronized and reproduced are supplied to the audio output apparatus 2 and are also supplied to the video display apparatus 3 through the audio output apparatus 2.

Configuration and Operation of Video Display Apparatus 3 in FIG. 4B

The video display apparatus 3 has the same configuration as those of the video display apparatuses 3 described above with reference to FIGS. 2 and 3. The video display apparatus 3 receives the video signal Vd and the audio signal Au from the audio output apparatus 2 through the I/F 31 and supplies the received video signal Vd and audio signal Au to the video audio processor 32. The I/F 31 detects a format (the number of scanning lines or the scanning method) of the supplied video signal Vd and indicates the detected format to the controller 33.

The video display apparatus 3 receives selection of a desired signal processing mode from the three signal processing modes including the film mode (high-quality mode), the camera mode (medium-quality mode), and the game mode (normal quality mode) through the operation unit 34 and indicates the selected signal processing mode to the controller 33 where the signal processing mode is set in the non-volatile memory.

The controller 33 controls the processing in the video audio processor 32 on the basis of the format of the video signal Vd supplied from the I/F 31 and the signal processing mode selected and set in the non-volatile memory in the controller 33, determines the processing time necessary to process the video signal and display the video corresponding to the video signal after the video signal is received, and indicates the delay control information Ct corresponding to the determined processing time to the upstream apparatus through the I/F 31 and the control signal lines indicated by the dotted lines.

However, in the video and audio processing system shown in FIG. 4B, the audio output apparatus 2 does not have the function of delaying the audio signal but the video and audio signal reproducing apparatus 1 has the function of delaying the audio signal. Accordingly, the video display apparatus 3 supplies the delay control information Ct for the audio signal to the video and audio signal reproducing apparatus 1.

As shown by the dotted line (2) in FIG. 4A, the video display apparatus 3 may be directly connected to the video and audio signal reproducing apparatus 1 via the control signal line, and the delay control information Ct for the audio signal may be indicated from the video display apparatus 3 to the video and audio signal reproducing apparatus 1. However, generally, the transmission paths of the video signal Vd and the audio signal Au are also considered and the video display apparatus 3 is connected to the video and audio signal reproducing apparatus 1 via the audio output apparatus 2 and the control signal lines indicated by the dotted lines in FIG. 4B. With this structure, the video signal line, the audio signal line, and the control signal line can be connected in the same manner.

In the video and audio processing system shown in FIG. 4B, the video and audio signal reproducing apparatus 1 is connected to the audio output apparatus 2 via the HDMI interface, the video signal Vd and the audio signal Au that are output from the video and audio signal reproducing apparatus 1 and that are to be synchronized and reproduced are supplied to the video display apparatus 3 through the audio output apparatus 2, and the delay control information Ct for the audio signal output from the video display apparatus 3 is also indicated to the video and audio signal reproducing apparatus 1 through the audio output apparatus 2.

Configuration and Operation of Audio Output Apparatus 2 in FIG. 4B

As shown in FIG. 4B, the audio output apparatus 2 includes the audio processing unit 21, the I/F 22, and an I/F 23. The I/F 22 and the I/F 23 are compliant with the HDMI specification. The video signal Vd and the audio signal Au supplied from the video and audio signal reproducing apparatus 1 are input into the audio output apparatus 2 through the I/F 23 and are supplied from the audio output apparatus 2 to the video display apparatus 3 through the I/F 22.

The audio signal Au supplied from the video and audio signal reproducing apparatus 1 and received through the I/F 23 is supplied to the audio processing unit 21 where the audio signal Au is converted into a signal having a format for the speaker SP. The converted signal is supplied to the speaker SP. As a result, a sound corresponding to the audio signal Au supplied from the video and audio signal reproducing apparatus 1 is output from the speaker SP.

The audio processing unit 21 in FIG. 4B does not include the delay processor 212, unlike the audio processing unit 21 in FIG. 3. The audio processing unit 21 in FIG. 4B has the function of separating the supplied audio signal Au into the audio signal components for channels, performing, for example, amplification to the audio signal components, and supplying the amplified audio signal components to the corresponding speakers.

The delay control information Ct for the audio signal, supplied through the I/F 31 in the video display apparatus 3, is received into the audio output apparatus 2 through the I/F 22 and is supplied from the audio output apparatus 2 to the video and audio signal reproducing apparatus 1 through the I/F 23. As described above, the audio output apparatus 2 in the second embodiment does not process the delay control information Ct for the audio signal supplied from the video and audio signal reproducing apparatus 1 and supplies (indicates) the delay control information Ct to the video and audio signal reproducing apparatus 1.

Configuration and Operation of Video and Audio Signal Reproducing Apparatus 1 in FIG. 4B The video and audio signal reproducing apparatus 1 shown in FIG. 4B includes a recording medium drive 11, a reader 12, a delay processor 13 for the audio signal, an I/F 14 according to the HDMI specification, and a controller 15. The video signal and the audio signal that are recorded in a recording medium, such as a DVD, loaded into the recording medium drive 11 and that are to be synchronized and reproduced are read out by the reader 12.

The readout video signal and audio signal are separated into the video signal Vd and the audio signal Au to be output by the reader 12. The video signal Vd is supplied to the audio output apparatus 2 through the I/F 14. The audio signal Au is supplied to the audio output apparatus 2 through the delay processor 13 and the I/F 14.

The delay control information Ct for the audio signal is indicated from the video display apparatus 3 to the video and audio signal reproducing apparatus 1 through the audio output apparatus 2 and the control signal line indicated by the dotted line. The I/F 14 in the video and audio signal reproducing apparatus 1 receives the delay control information Ct for the audio signal, supplied through the control signal line, converts the delay control information Ct into information having a format processable in the video and audio signal reproducing apparatus 1, and supplies the converted information to the controller 15.

The controller 15 controls the delay time (amount of delay) for the audio signal in the delay processor 13 on the basis of the delay control information Ct for the audio signal, supplied from the video display apparatus 3 and received through the I/F 14. Accordingly, the audio signal Au, in the video signal Vd and the audio signal Au output from the video and audio signal reproducing apparatus 1, is delayed on the basis of the delay control information Ct for the audio signal, supplied from the video display apparatus 3.

Consequently, in the audio output apparatus 2, normally processing the audio signal Au and supplying the processed audio signal Au to the speaker SP without delaying the audio signal Au allow the reproduced audio output from the speaker SP of the audio output apparatus 2 to be synchronized with the reproduced video displayed on the screen of the display unit of the video display apparatus 3 to prevent any delay in the lip synchronization.

In other words, even if the format of the supplied video signal is changed or the selected signal processing mode is switched in the video display apparatus 3, it is possible to appropriately control the delay processing of the audio signal in the video and audio signal reproducing apparatus 1, which is the most upstream apparatus in the video and audio processing system, at appropriate timing, because the delay control information Ct for the audio signal, supplied from the video display apparatus 3 and determined on the basis of the processing time of the video signal, is supplied to the video and audio signal reproducing apparatus 1.

Third Embodiment

FIG. 5 is a block diagram showing an example of the structure of a video and audio processing system to which the third embodiment is applied (corresponding to the dotted line (3) in FIG. 2), in which the video display apparatus 3 indicates the delay control information to both the audio output apparatus 2 and the video and audio signal reproducing apparatus 1 and both the audio output apparatus 2 and video and audio signal reproducing apparatus 1 perform the delay processing of the audio signal in a distributed manner.

The video and audio processing system shown in FIG. 5 includes the video and audio signal reproducing apparatus 1, the audio output apparatus 2, and the video display apparatus 3, as described above with reference to FIG. 2 and as in the video and audio processing systems shown in FIGS. 3 and 4B. As described above with reference to FIG. 2, the video signal Vd and the audio signal Au that are output from the video and audio signal reproducing apparatus 1 and that are to be synchronized and reproduced are supplied to the audio output apparatus 2 and are also supplied to the video display apparatus 3 through the audio output apparatus 2.

The audio output apparatus 2 performs the delay processing of the audio signal in the video and audio processing system shown in FIG. 3 and the video and audio signal reproducing apparatus 1 performs the delay processing of the audio signal in the video and audio processing system shown in FIGS. 4A and 4B. In contrast, in the video and audio processing system shown in FIG. 5, both the audio output apparatus 2 and the video and audio signal reproducing apparatus 1 perform the delay processing of the audio signal.

Specifically, the configuration of the video and audio processing system in FIG. 5 is adopted, for example, when the capability of the delay processing in the audio output apparatus 2 or the video and audio signal reproducing apparatus 1 is insufficient and the delay processing of the audio signal should be performed in the audio output apparatus 2 and the video and audio signal reproducing apparatus 1 in a distributed manner or when it is desirable that the load of the delay processing of the audio signal be distributed between the audio output apparatus 2 and the video and audio signal reproducing apparatus 1 for structural reasons.

In the video and audio processing system shown in FIG. 5, the video and audio signal reproducing apparatus 1 is connected to the audio output apparatus 2 via the interface according to the HDMI specification and the audio output apparatus 2 is connected to the video display apparatus 3 via the interface according to the HDMI specification. Not only the video signal and audio signal but also the control signal can be transferred between the video and audio signal reproducing apparatus 1 and the audio output apparatus 2 and between the audio output apparatus 2 and the video display apparatus 3. The apparatuses in the video and audio processing system shown in FIG. 5 will now be described in detail.

Configuration and Operation of Video Display Apparatus 3 in FIG. 5

The video display apparatus 3 in the video and audio processing system in FIG. 5 has the same configuration as those of the video display apparatuses 3 described above with reference to FIGS. 2, 3, 4A, and 4B. The video display apparatus 3 receives the video signal Vd and the audio signal Au from the audio output apparatus 2 through the I/F 31 and supplies the received video signal Vd and audio signal Au to the video audio processor 32. The I/F 31 detects a format (the number of scanning lines or the scanning method) of the supplied video signal Vd and indicates the detected format to the controller 33.

The video display apparatus 3 receives selection of a desired signal processing mode from the three signal processing modes including the film mode (high-quality mode), the camera mode (medium-quality mode), and the game mode (normal quality mode) through the operation unit 34 and indicates the selected signal processing mode to the controller 33 where the signal processing mode is set in the non-volatile memory.

The controller 33 controls the processing in the video audio processor 32 on the basis of the format of the video signal Vd supplied from the I/F 31 and the signal processing mode selected and set in the non-volatile memory in the controller 33, determines the processing time necessary to process the video signal and display the video corresponding to the video signal after the video signal is received, and indicates delay control information Ct1 corresponding to the determined processing time to the upstream apparatus through the I/F 31 and the control signal line indicated by the dotted line.

Configuration and Operation of Audio Output Apparatus 2 in FIG. 5

The audio output apparatus 2 in the video and audio processing system in FIG. 5 includes the audio processing unit 21 and the I/Fs 22 and 23 according to the HDMI specification. The video signal Vd and the audio signal Au supplied from the video and audio signal reproducing apparatus 1 are input into the audio output apparatus 2 through the I/F 23 and are supplied to the video display apparatus 3 through the I/F 22.

The delay control information Ct1 for the audio signal, supplied from the video display apparatus 3, is input into the audio output apparatus 2 through the I/F 22, is converted into a signal having a format processable in the audio output apparatus 2, and is supplied to the controller 211 in the audio processing unit 21. The audio processing unit 21 in the audio output apparatus 2 in FIG. 5 includes the controller 211, the delay processor 212, and the amplifier 213.

The controller 211 in the audio output apparatus 2 in FIG. 5 is a microcomputer including a CPU, a ROM, a RAM, and so on (not shown). The controller 211 controls the delay processing of the audio signal in the delay processor 212 on the basis of the delay control information Ct1 supplied from the video display apparatus 3 through the I/F 22, the capability of the delay processing of the audio signal of the audio output apparatus 2, or the percentage of the delay processing of the audio signal which is imposed on the audio output apparatus 2.

The controller 211 calculates any difference in the amount of delay of the audio signal between the delay processing of the audio signal performed on the basis of the delay control information Ct1 supplied from the video display apparatus 3 and the delay processing of the audio signal performed in the delay processor 212 in the audio output apparatus 2. The controller 211 indicates information concerning the difference to the video and audio signal reproducing apparatus 1 through the I/F 23 as delay control information Ct2 to the video and audio signal reproducing apparatus 1.

Specifically, the controller 211 generates the delay control information Ct2 corresponding to the difference given by subtracting the amount of delay in the delay processing of the audio signal performed in the audio output apparatus 2 from the amount of delay in the delay processing of the audio signal, performed on the basis of the delay control information Ct1 supplied from the video display apparatus 3, and supplies the generated delay control information Ct2 to the video and audio signal reproducing apparatus 1 through the I/F 23.

The delay processor 212 receives the audio signal Au from the video and audio signal reproducing apparatus 1 through the I/F 23, delays the audio signal Au by the amount of delay in accordance with the control information from the controller 211, and supplies the delayed audio signal to the amplifier 213. The amplifier 213 is also controlled by the controller 211. The amplifier 213 amplifies the supplied audio signal and supplies the amplified audio signal to the speaker SP.

As described above, the audio output apparatus 2 in the video and audio processing system in FIG. 5 has the function of delaying the audio signal that is received from the video and audio signal reproducing apparatus 1 and that is to be reproduced and output. However, the audio output apparatus 2 does not perform the entire delay processing corresponding to the delay control information Ct1 supplied from the video display apparatus 3 but performs the delay processing corresponding to the capability of the delay processing of the audio output apparatus 2 or the percentage of the delay processing of the audio signal which is imposed on the audio output apparatus 2, and imposes the remaining delay processing of the audio signal on the video and audio signal reproducing apparatus 1, which is the most upstream apparatus.

Configuration and Operation of Video and Audio Signal Reproducing Apparatus 1 in FIG. 5

The video and audio signal reproducing apparatus 1 in FIG. 5 has the same configuration as that of the video and audio signal reproducing apparatus 1 in FIG. 4B. Specifically, the video and audio signal reproducing apparatus 1 in the video and audio processing system in FIG. 5 includes the recording medium drive 11, the reader 12, the delay processor 13 for the audio signal, the I/F 14 according to the HDMI specification, and the controller 15. The video signal and the audio signal that are recorded in a recording medium, such as a DVD, loaded into the recording medium drive 11 and that are to be synchronized and reproduced are read out by the reader 12.

The readout video signal and audio signal are separated into the video signal Vd and the audio signal Au to be output by the reader 12. The video signal Vd is supplied to the audio output apparatus 2 through the I/F 14. The audio signal Au is supplied to the audio output apparatus 2 through the delay processor 13 and the I/F 14.

The I/F 14 in the video and audio signal reproducing apparatus 1 receives the delay control information Ct2 for the audio signal, supplied from the audio output apparatus 2 through the control signal line indicated by the dotted line, converts the delay control information Ct2 into information having a format processable in the video and audio signal reproducing apparatus 1, and supplies the converted information to the controller 15.

The controller 15 controls the amount of delay for the audio signal in the delay processor 13 on the basis of the delay control information Ct2 for the audio signal, supplied from the audio output apparatus 2 through the I/F 14. Accordingly, the audio signal Au, in the video signal Vd and the audio signal Au output from the video and audio signal reproducing apparatus 1, is delayed on the basis of the delay control information Ct2 for the audio signal, supplied from the audio output apparatus 2.

Summary of Operation of Video and Audio Processing System in FIG. 5

In the video and audio processing system shown in FIG. 5, as described above with reference to FIG. 2 and as in the video and audio processing systems shown in FIGS. 3 and 4B, the video signal Vd and the audio signal Au that are supplied from the video and audio signal reproducing apparatus 1 and that are to be synchronized and reproduced are supplied to the audio output apparatus 2 and to the video display apparatus 3 through the audio output apparatus 2. The delay processing of the audio signal, in accordance with the time necessary to process the video signal Vd and display the video corresponding to the video signal on the screen of the display unit after the video signal Vd is supplied to the video display apparatus 3, is distributed between the audio output apparatus 2 and the video and audio signal reproducing apparatus 1.

Accordingly, the output of the audio signal from the audio output apparatus 2 can be delayed in accordance with the time necessary to perform the delay processing of the audio signal in the audio output apparatus 2 and the delay processing of the audio signal in the video and audio signal reproducing apparatus 1 and to display the video corresponding to the video signal on the screen of the display unit after the video signal Vd is supplied to the video display apparatus 3.

In the video and audio processing system in FIG. 5, even if the format of the supplied video signal is changed or the selected signal processing mode is switched in the video display apparatus 3, it is possible to appropriately control the delay processing of the audio signal at appropriate timing because the delay processing on the basis of the delay control information Ct1 for the audio signal, supplied from the video display apparatus 3 and determined in accordance with the processing time of the video signal, can be distributed between the audio output apparatus 2 and the video and audio signal reproducing apparatus 1.

In addition, since the load of the delay processing of the audio signal is distributed between the audio output apparatus 2 and the video and audio signal reproducing apparatus 1, it is possible to improve the capability of the delay processing of the audio signal in the entire video and audio processing system and to distribute the load of the delay processing of the audio signal on the audio output apparatus 2 and the video and audio signal reproducing apparatus 1 in the video and audio processing system. Consequently, the load of the delay processing can be well within the processing capabilities of the audio output apparatus 2 and the video and audio signal reproducing apparatus 1.

Both the controller 211 in the audio output apparatus 2 and the controller 15 in the video and audio signal reproducing apparatus 1 can appropriately set the amount of delay of the audio signal in the audio output apparatus 2 and the video display apparatus 3, respectively, in consideration of the processing time of the audio signal in the respective apparatuses.

Delay Control Information Transmitted to Upstream Apparatus

The format of the delay control information supplied from the video display apparatus 3 to the audio output apparatus 2 or the video and audio signal reproducing apparatus 1 or of the delay control information supplied from the audio output apparatus 2 to the video and audio signal reproducing apparatus 1 will now be described with reference to FIGS. 6 and 7. The delay control information is denoted by the delay control information Ct in the following description.

FIG. 6 illustrates an example in which the delay control information Ct has two bytes. In the delay control information Ct, the first byte indicates an identifier (apparatus ID) used for identifying an apparatus to which the delay control information Ct is transmitted and the second byte indicates delay information corresponding to the amount of delay of the audio signal.

A time, such as 200 ms, 150 ms, or 20 ms, necessary to process the video signal Vd and display the video corresponding to the video signal after the video display apparatus 3 receives the video signal Vd is used as the delay information.

If a delay level is determined in accordance with the format of the supplied video signal and the set signal processing mode and the audio output apparatus 2 or the video and audio signal reproducing apparatus 1 can determine the processing time of the video signal in the video display apparatus 3, corresponding to the determined delay level (the time necessary to process the video signal and display the video corresponding to the video signal Vd after the video display apparatus 3 receives the video signal Vd), information indicating the delay level may be used as the delay information. For example, the delay level is set to "Level 1" if the 480p video signal is supplied and the set signal processing mode is the film mode (high-quality mode) and is set to "Level 2" if the 720p video signal is supplied and the set signal processing mode is film mode (high-quality mode).

In addition, a variety of information with which the amount of delay of the audio signal can be determined in an apparatus upstream of the video display apparatus 3 can be used as the delay information.

FIG. 7 illustrates an example in which the delay control information Ct has four bytes. In the delay control information Ct, the first byte indicates an identifier (apparatus ID) used for identifying an apparatus to which the delay control information Ct is transmitted. The second byte indicates a resolution of the video signal Vd which the video display apparatus 3 receives.

The third byte indicates delay information used for delaying the audio signal in accordance with the time necessary to display the video corresponding to the video signal Vd at the resolution indicated by the second byte (default delay information for the video signal having the resolution indicated by the second byte (delay information for the audio signal)). The fourth byte indicates actual delay information (updated delay information) corresponding to the time necessary to process the video signal and display the video corresponding to the video signal after the video signal is supplied to the video display apparatus 3, in consideration of the signal processing mode set in the video display apparatus 3.

For example, it is assumed that the video and audio signal reproducing apparatus 1 is provided with a high-capacity recording medium, such as a hard disk recorder. It is also assumed that the video and audio signal reproducing apparatus 1 can record and store multiple pieces of audio visual content having different resolutions on the recording medium, can easily select and play back a desired piece of the audio visual content among the multiple pieces of the audio video content, and can repeatedly switch the content that is played back during a short time.

In such a case, the content that is played back can be switched to the ones having different resolutions (having different formats of the video signal) several times during a short time. If such a situation occurs, different pieces of the delay control information Ct are supplied from the video display apparatus 3 to the upstream apparatuses. The audio output apparatus 2 or the video and audio signal reproducing apparatus 1 possibly cannot determine which delay control information is effective on the basis of the time when the delay control information Ct is generated or transmitted.

However, the inclusion of the information indicating the resolution of the video signal Vd which the video display apparatus 3 receives in the delay control information Ct, as in the example shown in FIG. 7, allows the audio output apparatus 2 or the video and audio signal reproducing apparatus 1 to detect the resolution of the video signal which the audio output apparatus 2 or the video and audio signal reproducing apparatus 1 receives or transmits and to refer to information indicating the resolution in the delay control information supplied from the downstream apparatus, such as the video display apparatus 3 or the audio output apparatus 2, in order to determine which delay control information is effective.

In addition, the inclusion of the resolution, the default delay information, and the updated delay information in the delay control information Ct allows the upstream apparatus, such as the audio output apparatus 2 or the video and audio signal reproducing apparatus 1, which receives the delay control information Ct, to use the supplied delay control information Ct as information used for accurately determining how long the audio signal should be delayed in the upstream apparatus in order to more appropriately perform the delay processing of the audio signal.

The pieces of the delay control information Ct shown in FIGS. 6 and 7 are only examples and delay control information having another format may be used as long as the most downstream video display apparatus 3 can appropriately indicate the amount of delay of the audio signal to the upstream apparatus.

Although the control signal lines indicated by dotted lines in FIGS. 2 to 5 are used to transmit the control information in one direction from the most downstream video display apparatus 3 to the upstream apparatus in the above embodiments, the control signal lines are not limited to those examples. As described above, if the apparatuses are connected to each other via an interface that is compliant with the HDMI specification and that connects the video signal line, the audio signal line, and the control signal line to each other, the control signal can be transferred between the apparatuses by using a dedicated control line called control signal schematic (CEC) as the control signal line.

In the above embodiments, various interfaces including an interface compliant with Institute of Electrical and Electronics Engineers (IEEE) 1394 standard, having separate control signal lines, can be used as the interface connecting the video signal line, the audio signal line, and the control signal line to each other, in addition to the interface compliant with the HDMI specification. An interface different from those of the video signal line and the audio signal line may be used for the control signal line.

Although the video signal line through which the video signal Vd is transmitted and the audio signal line through which the audio signal Au is transmitted are separately provided in the above embodiments, embodiments of the present invention are applicable to a case where an interface in which the video signal and the audio signal are subjected to time division multiplexing to transmit the video signal and the audio signal through the same transmission path is used.

The interface connecting the apparatuses is not limited to a digital interface and may be an analog interface.

Although the video and audio signal reproducing apparatus 1 and the audio output apparatus 2 are separately provided in the above embodiments, embodiments of the present invention are not limited to this. Embodiments of the present invention are applicable to a case where the video and audio signal reproducing apparatus 1 is integrated with the audio output apparatus 2.

It should be understood by those skilled in the art that various modifications, combinations, sub-combinations and alterations may occur depending on design requirements and other factors insofar as they are within the scope of the appended claims or the equivalents thereof.

What is claimed is:

1. A video and audio processing system comprising:
an output apparatus to output video data and audio data to be synchronized and reproduced;
an audio processing apparatus to receive the video data and the audio data from the output apparatus, output at least the video data to a downstream apparatus, and process the audio data to generate an audio signal to be supplied to a speaker; and
a video processing apparatus to receive the video data output from the audio processing apparatus and generate a video signal,
wherein the video processing apparatus comprises
video signal processing means for generating the video signal having a predetermined quality from the video data output from the audio processing apparatus;
control means for controlling the processing in the video signal processing means on the basis of a format of the video data output from the audio processing apparatus and/or a signal processing mode that is set; and
determining means for determining a processing time necessary to process the video data in the video signal processing means and display the video after the video data is received, if the content of the processing in the video signal processing means is changed by the control means, and
wherein the video and audio processing system delays the audio signal to be supplied to the speaker so as to be synchronized with the displayed video on the basis of the determination result of the processing time by the determining means.

2. The video and audio processing system according to claim 1,
wherein the video processing apparatus further comprises
output means for supplying the determined processing time to the audio processing apparatus, and
wherein the audio processing apparatus comprises
delay means for delaying the audio signal to be supplied to the speaker;
input means for receiving the processing time from the output means in the video processing apparatus; and
delay control means for controlling the delay means on the basis of the processing time received by the input means.

3. The video and audio processing system according to claim 2,
wherein the audio processing apparatus further comprises
audio data processing means for performing predetermined processing to the input audio data and supplying the processed audio data to the speaker as the audio signal; and
delay time determining means for determining a delay time before the input audio data is supplied to the speaker, and
wherein the delay control means controls the delay means on the basis of the processing time received by the input means and the delay time.

4. The video and audio processing system according to claim 3,
wherein the delay control means in the audio processing apparatus controls the delay means on the basis of a difference between the processing time received by the input means and the delay time.

5. The video and audio processing system according to claim 1,
wherein the video processing apparatus further comprises
output means for supplying the determined processing time to the audio processing apparatus, and
wherein the output apparatus comprises
delay means for delaying the output of the audio signal;
input means for receiving information concerning the processing time output from the video processing apparatus; and
delay control means for controlling a delay time of the audio signal in the delay means on the basis of the processing time received by the input means.

6. The video and audio processing system according to claim 5,
wherein the audio processing apparatus further comprises
audio data processing means for performing predetermined processing to the input audio data and supplying the processed audio data to the speaker as the audio signal;
delay time determining means for determining a delay time before the input audio data is supplied to the speaker; and
output means for supplying the determined delay time to the output apparatus,
wherein the output apparatus further comprises
delay time input means for receiving the delay time from the output means in the audio processing apparatus, and
wherein the delay control means in the output apparatus controls the delay means on the basis of the processing time received by the input means and the delay time received by the delay time input means.

7. A video processing apparatus for use in a video and audio processing system comprising an output apparatus to output video data and audio data to be synchronized and reproduced and an audio processing apparatus to receive the video data and the audio data from the output apparatus, output at least the video data to a downstream apparatus, and process the audio data to generate an audio signal to be supplied to a speaker, the video processing apparatus receiving the video data output from the audio processing apparatus and generating a video signal, the video processing apparatus comprising:

video signal processing means for generating a video signal having a predetermined quality from the video data output from the audio processing apparatus;

control means for controlling the processing in the video signal processing means on the basis of a format of the video data output from the audio processing apparatus and/or a signal processing mode that is set;

determining means for determining a processing time necessary to process the video data in the video signal processing means and display the video after the video data is received, if the content of the processing in the video signal processing means is changed by the control means; and output means for supplying the determined processing time to another apparatus.

8. An audio processing apparatus for use in a video and audio processing system comprising an output apparatus to output video data and audio data to be synchronized and reproduced and a video processing apparatus to receive the video data output from the audio processing apparatus and generate a video signal used for displaying video, the audio processing apparatus receiving the video data and the audio data from the output apparatus, outputting at least the video data to a downstream apparatus, and processing the audio data to generate an audio signal to be supplied to a speaker, the audio processing apparatus comprising:

receiving means for receiving information concerning a processing time necessary to perform video signal processing in which the video signal having a predetermined quality is generated from the video data from the video processing apparatus if the content of the video signal processing is changed;

input means for receiving the audio data from the output apparatus;

delay means for delaying a time necessary to supply the audio data received by the input means to the speaker as the audio signal; and control means for controlling the delay time in the delay means on the basis of the information concerning the processing time received by the receiving means.

9. The audio processing apparatus according to claim 8, further comprising:

processing time determining means for determining a processing time necessary to generate the audio signal from the audio data and supply the audio signal to the speaker, wherein the control means controls the delay time in the delay means on the basis of the processing time determined by the processing time determining means and the processing time received by the receiving means.

10. An output apparatus to output video data and audio data to be synchronized and reproduced, the output apparatus being included in a video and audio processing system comprising an audio processing apparatus to receive the video data and the audio data from the output apparatus, output at least the video data to a downstream apparatus, and process the audio data to generate an audio signal to be supplied to a speaker and a video processing apparatus to receive the video data output from the audio processing apparatus and generate a video signal, the output apparatus comprising:

receiving means for receiving information concerning a processing time necessary to perform video signal processing in which the video signal having a predetermined quality is generated from the video data, the information concerning the processing time being output from the video processing apparatus if the content of the video signal processing is changed;

output means for outputting the audio data;

delay means for delaying the output of the audio data from the output means; and control means for controlling a delay time of the audio data in the delay means on the basis of the information concerning the processing time received by the receiving means.

11. The output apparatus according to claim 10, further comprising:

delay time receiving means for receiving the delay time during which the audio processing apparatus receives the audio data and supplies the audio data to the speaker from the audio processing apparatus, wherein the control means controls the delay time of the audio data in the delay means on the basis of the information concerning the processing time received by the receiving means and the delay time received by the delay time receiving means.

12. A control method for a video and audio processing system comprising an output apparatus to output video data and audio data to be synchronized and reproduced, an audio processing apparatus to receive the video data and the audio data from the output apparatus, supplies at least the video data to a downstream apparatus, and process the audio data to generate an audio signal to be supplied to a speaker, and a video processing apparatus to receive the video data output from the audio processing apparatus and generate a video signal, the control method comprising the steps of:

determining a processing time necessary for the video processing apparatus to generate the video signal having a predetermined quality from the video data on the basis of a format of the video data and/or a signal processing mode that is set if the content of the processing is changed; and delaying the audio signal to be supplied to the speaker on the basis of the determined processing time.

13. A video and audio processing system comprising:

an output apparatus to output video data and audio data to be synchronized and reproduced;

an audio processing apparatus to receive the video data and the audio data from the output apparatus, output at least the video data to a downstream apparatus, and process the audio data to generate an audio signal to be supplied to a speaker; and a video processing apparatus to receive the video data output from the audio processing apparatus and generates a video signal, wherein the video processing apparatus comprises video signal processing means for generating the video signal having a predetermined quality from the video data output from the audio processing apparatus, control means for controlling the processing in the video signal processing means on the basis of a format of the video data output from the audio processing apparatus and/or a signal processing mode that is set, determining means for determining a processing time necessary to process the video data in the video signal processing means and display the video after the video data is received, if the content of the processing in the video signal processing means is changed by the control means, and indicating means for indicating the processing time determined by the determining means to the audio processing apparatus, wherein the audio processing apparatus comprises acquiring means for acquiring information concerning the processing time indicated by the video processing apparatus, difference calculating means for calculating a difference between the processing time indicated by the video processing apparatus and a processing time of the audio signal in the audio processing apparatus, and difference indicating means for indicating information concerning the difference in the processing time calculated by the difference calculating means to the output apparatus, and wherein the output apparatus comprises delay means for delaying the audio signal to be output, difference acquiring means for acquiring information concerning the difference in the processing time, indicated by the audio processing apparatus, and delay control means for controlling the delay time of the audio signal in the delay means on the basis of the information concerning the difference in the processing time acquired by the difference acquiring means.

14. A video and audio processing system comprising:

an output apparatus to output video data and audio data to be synchronized and reproduced;

an audio processing apparatus to receive the video data and the audio data from the output apparatus, output at least the video data to a downstream apparatus, and process the audio data to generate an audio signal to be supplied to a speaker; and a video processing apparatus to receive the video data output from the audio processing apparatus and generates a video signal, wherein the video processing apparatus comprises a video signal processing unit to generate the video signal having a predetermined quality from the video data output from the audio processing apparatus;

a control unit to control the processing in the video signal processing unit on the basis of a format of the video data output from the audio processing apparatus and/or a signal processing mode that is set; and a determining unit to determine a processing time necessary to process the video data in the video signal processing unit and display the video after the video data is received, if the content of the processing in the video signal processing unit is changed by the control unit, and wherein the video and audio processing system delays the audio signal to be supplied to the speaker so as to be synchronized with the displayed video on the basis of the determination result of the processing time by the determining unit.

15. A video processing apparatus for use in a video and audio processing system comprising an output apparatus that outputs video data and audio data to be synchronized and reproduced and an audio processing apparatus that receives the video data and the audio data from the output apparatus, supplies at least the video data to a downstream apparatus, and processes the audio data to generate an audio signal to be supplied to a speaker, the video processing apparatus receiving the video data output from the audio processing apparatus and generating a video signal, the video processing apparatus comprising:

a video signal processing unit to generate the video signal having a predetermined quality from the video data output from the audio processing apparatus;

a control unit to control the processing in the video signal processing unit on the basis of a format of the video data output from the audio processing apparatus and/or a signal processing mode that is set;

a determining unit to determine a processing time necessary to process the video data in the video signal processing unit and display the video after the video data is received, if the content of the processing in the video signal processing unit is changed by the control unit; and an output unit to supply the determined processing time to another apparatus.

16. An audio processing apparatus for use in a video and audio processing system comprising an output apparatus to output video data and audio data to be synchronized and reproduced and a video processing apparatus to receive the video data output from the audio processing apparatus and generate a video signal, the audio processing apparatus receiving the video data and the audio data from the output apparatus, supplying at least the video data to a downstream apparatus, and processing the audio data to generate an audio signal to be supplied to a speaker, the audio processing apparatus comprising:

a receiving unit to receive information concerning a processing time necessary to perform video signal processing in which the video signal having a predetermined quality is generated from the video data from the video processing apparatus if the content of the video signal processing is changed;

an input unit to receive the audio data from the output apparatus;

a delay unit to delay a time necessary to supply the audio data received by the input unit to the speaker as the audio signal; and a control unit to control the delay time in the delay unit on the basis of the information concerning the processing time received by the receiving unit.

17. An output apparatus to output video data and audio data to be synchronized and reproduced, the output apparatus being included in a video and audio processing system comprising an audio processing apparatus to receive the video data and the audio data from the output apparatus, output at least the video data to a downstream apparatus, and process the audio data to generate an audio signal to be supplied to a speaker and a video processing apparatus to receive the video data output from the audio processing apparatus and generate a video signal, the output apparatus comprising:

a receiving unit to receive information concerning a processing time necessary to perform video signal processing in which the video signal having a predetermined quality is generated from the video data, the information concerning the processing time being output from the video processing apparatus if the content of the video signal processing is changed;

an output unit to output the audio data;

a delay unit to delay the output of the audio data from the output unit; and a control unit to control a delay time of the audio data in the delay unit on the basis of the information concerning the processing time received by the receiving unit.

18. A video and audio processing system comprising:
an output apparatus to output video data and audio data to be synchronized and reproduced;
an audio processing apparatus to receive the video data and the audio data from the output apparatus, output at least the video data to a downstream apparatus, and process the audio data to generate an audio signal to be supplied to a speaker; and
a video processing apparatus-to receive the video data output from the audio processing apparatus and generate a video signal,
wherein the video processing apparatus comprises
- a video signal processing unit to generate the video signal having a predetermined quality from the video data output from the audio processing apparatus;
- a control unit to control the processing in the video signal processing unit on the basis of a format of the video data output from the audio processing apparatus and/or a signal processing mode that is set;
- a determining unit to determine a processing time necessary to process the video data in the video signal processing unit and display the video after the video data is received, if the content of the processing in the video signal processing unit is changed by the control unit; and
- an indicating unit to indicate the processing time determined by the determining unit to the audio processing apparatus, wherein the audio processing apparatus comprises
- an acquiring unit to acquire information concerning the processing time indicated by the video processing apparatus;
- a difference calculating unit to calculate a difference between the processing time indicated by the video processing apparatus and a processing time of the audio signal in the audio processing apparatus; and
- a difference indicating unit to indicate information concerning the difference in the processing time calculated by the difference calculating unit to the output apparatus, and wherein the output apparatus comprises
- a delay unit to delay the audio signal to be output;
- a difference acquiring unit to acquire information concerning the difference in the processing time, indicated by the audio processing apparatus; and
- a delay control unit to control the delay time of the audio signal in the delay unit on the basis of the information concerning the difference in the processing time acquired by the difference acquiring unit.

* * * * *